United States Patent [19]

Portas et al.

[11] 3,843,210

[45] Oct. 22, 1974

[54] ANTI-SKID SYSTEMS

[75] Inventors: Donald Portas, Cotesbach near Rugby; John F. B. Aubury, Coventry, both of England

[73] Assignee: Dunlop Limited, London, England

[22] Filed: June 30, 1972

[21] Appl. No.: 268,075

[30] Foreign Application Priority Data
July 7, 1971  Great Britain................... 31778/71

[52] U.S. Cl.......... 303/21 CG, 188/181 A, 244/111
[51] Int. Cl............................................. B60t 8/12
[58] Field of Search ......... 188/181; 235/150.2, 152, 235/177; 244/111; 303/20, 21; 307/221, 223; 317/5; 324/160–162; 340/53, 146.2, 262–263

[56] References Cited
UNITED STATES PATENTS

| | | | |
|---|---|---|---|
| 3,589,776 | 6/1971 | Wehde............................ | 303/21 CG |
| 3,608,978 | 9/1971 | Neisch........................... | 303/21 EB |
| 3,652,135 | 3/1972 | Baumann....................... | 303/21 CF |
| 3,724,903 | 4/1973 | Okamoto et al............. | 303/21 BE X |

*Primary Examiner*—Trygve M. Blix
*Assistant Examiner*—Stephen G. Kunin
*Attorney, Agent, or Firm*—Stevens, Davis, Miller & Mosher

[57] ABSTRACT

A vehicle anti-skid system provided with a pulse generator arranged to produce an electrical signal at a frequency proportional to the angular velocity of a braked wheel of the vehicle, an apparatus for generating a digital count proportional to the angular velocity of the braked wheel, apparatus for comparing the count generated during a particular time interval with the count generated during a previous time interval thereby obtaining a measure of the actual rate of change of angular velocity of the braked wheel, apparatus for comparing this measure with a preset signal proportional to the maximum permissible rate of change of angular velocity of the wheel and apparatus arranged to release the brake associated with the wheel when the actual rate of change of velocity of the wheel exceeds the maximum permissible rate of change.

8 Claims, 11 Drawing Figures

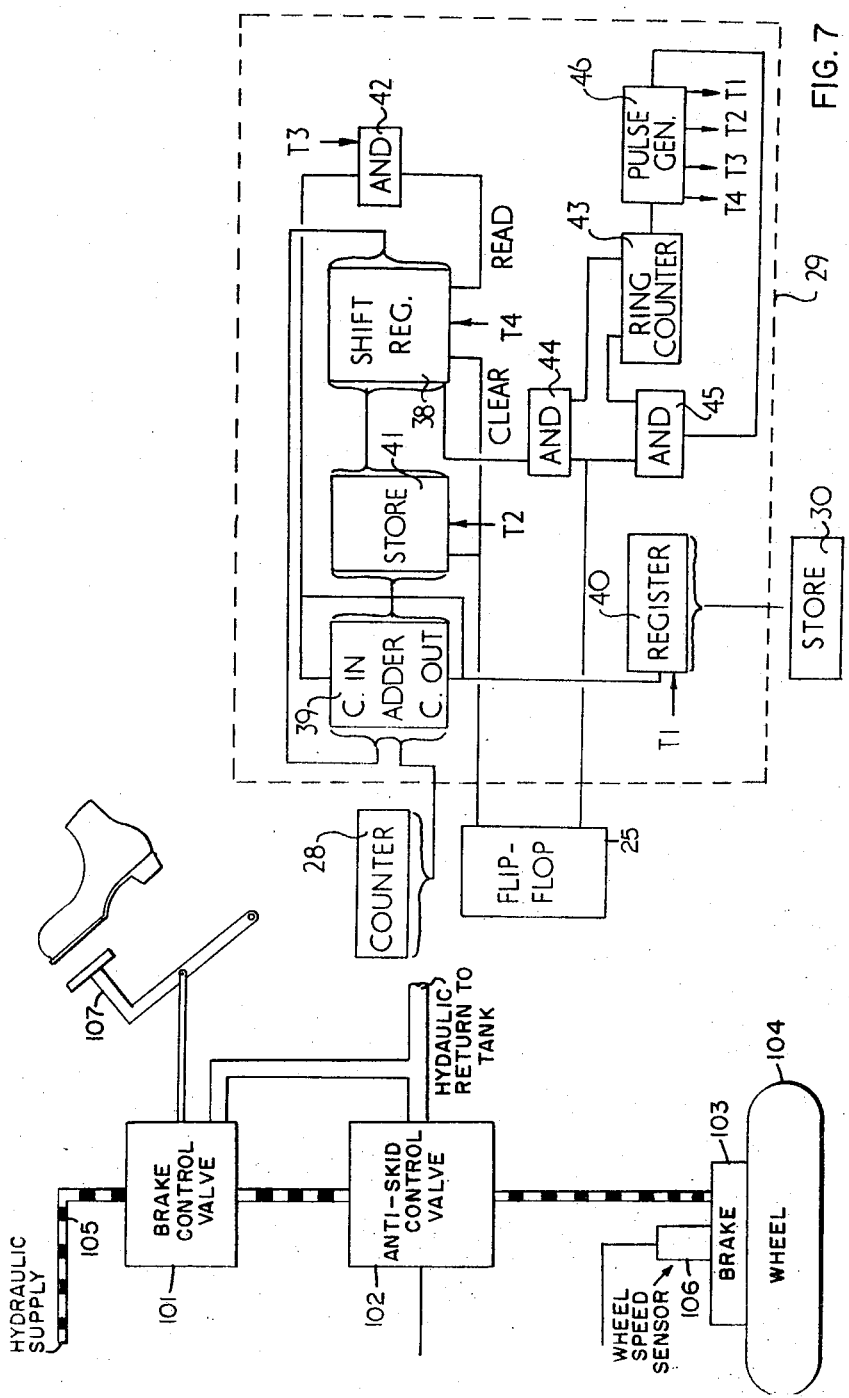

ANTI-SKID SYSTEMS

This invention relates to vehicle anti-skid systems and particularly, though not exclusively, to such systems for use in aircraft.

One object of the present invention is to provide a stable anti-skid system.

A vehicle anti-skid system in accordance with the present invention comprises a pulse generator arranged to produce an electrical signal at a frequency proportional to the angular velocity of a braked wheel of the vehicle, a means of generating a digital count proportional to the angular velocity of the braked wheel, a means for comparing the count generated during a particular time interval with the count generated during a previous time interval thereby obtaining a measure of the actual rate of change of angular velocity of the braked wheel, a means for comparing this measure with a pre-set signal proportional to the maximum permissible rate of change of angular velocity of the wheel and means arranged to release the brake associated with the wheel when the actual rate of change of velocity of the wheel exceeds the maximum permissible rate of change.

Several embodiments of the present invention, as applied to anti-skid systems for aircraft, will now be described by way of example with reference to FIGS. 1 to 7 of the accompanying drawings, in which:

FIG. 7 is a schematic diagram of a divider suitable for use in the system shown in FIG. 6, and FIG. 8 is a block diagram showing elements of a braking system.

Figure 1:
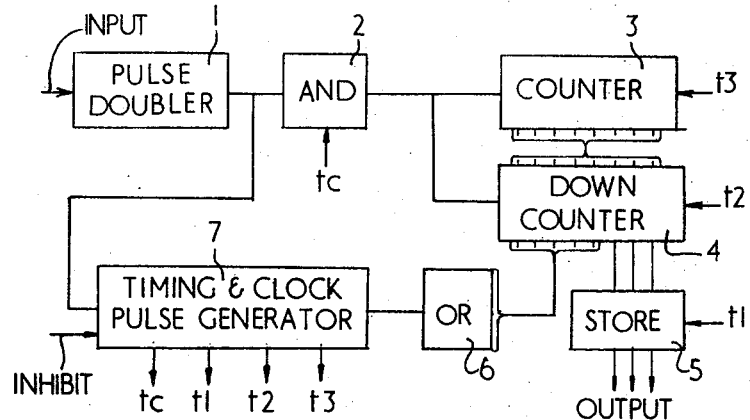
FIG. 1 is a schematic diagram of one form of antiskid system in accordance with the present invention.

Referring to FIG. 8, there is shown a typical braking system comprising a brake control valve 101, an antiskid control valve 102 and a hydraulically operated brake 102 associated with the wheel 104 of the vehicle. A hydraulic supply feeds the control valves 101 and 102 and the brake 103 by means of a conduit 105. A wheel speed sensor 106 in the form of a pulse generator is coupled to the wheel 104 and provides an electrical signal having a frequency directly proportional to the angular velocity of the wheel. Control of the brakes is achieved manually by operation of foot pedal 107 and brake control valve 101 and automatically through anti-skid control valve 102 as will be explained hereinafter.

FIG. 1 shows a system in accordance with the present invention comprising a pulse doubler 1, an AND gate 2, a binary counter 3, a binary down counter 4, a binary store 5, an OR gate 6 and a timing and clock pulse generator 7.

The system is arranged so that pulses from a generator 106 associated with a braked wheel of the aircraft are passed via pulse doubler 1 and AND gate 2 to counter 3. The generator 106 is arranged to generate an electrical signal at a frequency directly proportional to the angular velocity of the braked wheel. Thus by counting the number of pulses from the generator in a given time interval a measure of the angular velocity of the associated wheel can be obtained. By comparing this count with the count for a previous time interval a measure of the rate of change of angular velocity of the wheel is obtained.

The system is controlled by timing and clock pulse generator 7. Clock pulse generator 7 is arranged to initiate a count by the passage of a clock pulse to AND gate 2, AND gate 2 only allowing the passage of generator pulses to counter 3 when clock pulse tc is also applied.

At the end of a count the count recorded in counter 3 is transferred to down counter 4 by a timing pulse $t2$ and the counter is then cleared by a further timing pulse $t3$. During the succeeding count the pulses are counted into counter 3 and off down counter 4, so that at the end of the succeeding count, the count remaining in down counter 4 is the difference between two successive counts recorded by counter 3.

At the end of each time interval the count remaining in down counter 4 is transferred to store 5 by a timing pulse $t1$. Thus store 5 contains a count which is proportional to the rate of change of the angular velocity of the braked wheel. From the count in store 5 is subtracted a binary coded signal proportional to the maximum permissible rate of change of velocity and the error signal thus obtained, after conversion into an analog signal in a digital to analog converter (not shown), is arranged to release the brakes of the vehicle when the maximum permissible deceleration level is exceeded.

Down counter 4 is so arranged that in the event of the difference between successive counts exceeding a figure of say 30 percent, which is not possible, due to the short count intervals, when the system is functioning correctly, the timing and clock pulse generator 7 is inhibited so that the count remaining in the down counter is not transferred to the store 5. This inhibit function is provided by linking the upper 70 percent of the down counter digits to clock pulse generator 7 via OR gate 6 so that when an output occurs on any of these digits the resetting of the store is inhibited.

Figure 2:
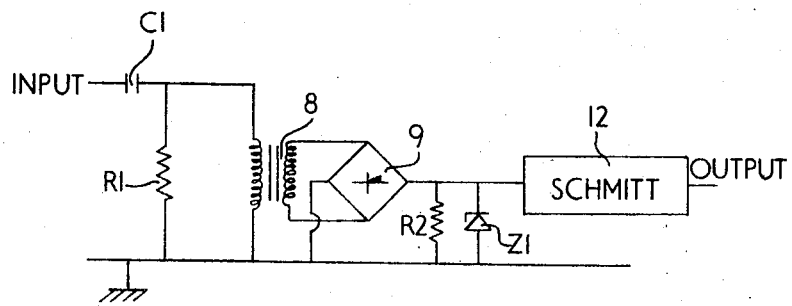
FIG. 2 is a circuit diagram of a pulse doubler suitable for use in an anti-skid system in accordance with the present invention.
Figure 3A:
FIGS. 3a–3d show the wave form at various points in the circuit shown in FIG. 2.
Figure 3B:
Figure 3C:
Figure 3D:

The circuit of pulse doubler 1 is shown in detail in FIG. 2. The pulses enter the doubler in the form shown in FIG. 3(a). The pulses then pass through a differentiator stage comprising capacitor C1 and resistor R1 whereupon the wave form is differentiated to the form shown in FIG. 3(b). The signals then pass through a 1:1 isolating transformer 8 and hence to a bridge rectifier 9 and a resistance and zener diode combination R2 and Z1 which rectifies the signal and limits the maximum voltage to a value below the breakdown voltage of a Schmitt trigger 12 as shown in FIG. 3(c). The signal then passes through Schmitt trigger 12 which produces a square wave output at twice the frequency of the doubler input, as shown in FIG. 3(d).

The system shown in FIG. 1 functions as follows:

The first count is initiated by the passage of clock pulse $tc$ to AND gate 2. Counter 3 then starts to count the pulses from the generator associated with the braked wheel and down counter 4 commences simultaneously to count off its residual count, this being the count present in down counter 4 as a result of the previous operation of the system. Normally the count remaining in down counter 4 at the end of the first count is such that timing and clock pulse generator 7 is inhibited, in the manner previously described, and the count in down counter 4 is not transferred to store 5 by clock pulse $t1$.

At the end of the first count timing pulses $t2$ and $t3$ transfer the count from counter 3 to down counter 4 and clear counter 3, respectively, prior to the second clock pulse $tc$ which initiates the second count and the down counting on the first count now held in down counter 4. At the end of the second count the count remaining in down counter 4 is transferred to store 5 by timing pulse $t1$ and a binary coded signal proportional to the maximum permissible rate of change of velocity is subtracted from the store count, as previously explained, to give an error signal which is used to release the aircraft brakes when the maximum permissible deceleration level is exceeded. Thus by repeating this series of control pulses $tc$, $t1$, $t2$ and $t3$ the system continuous monitors the rate of change of angular velocity of the associated wheel.

Figure 4:
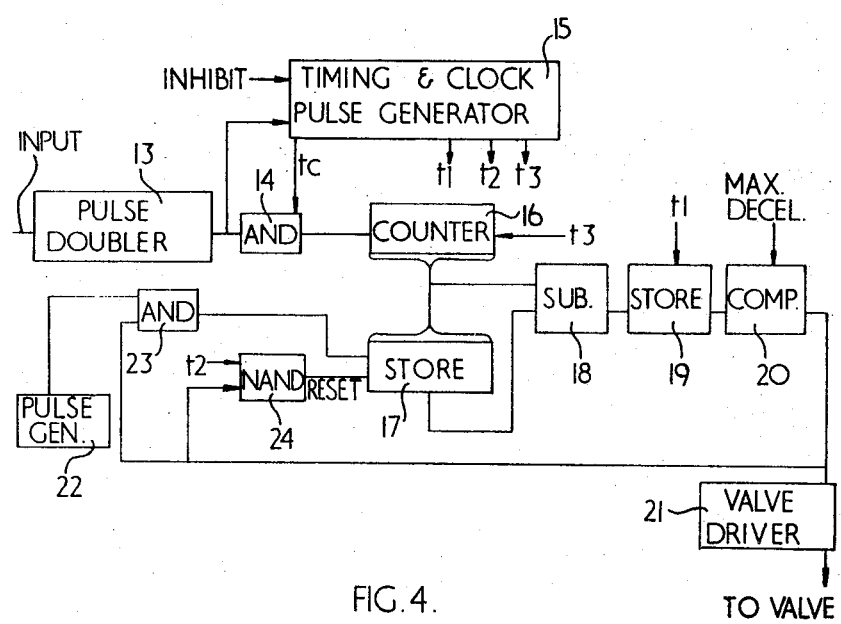
FIG. 4 is a schematic diagram of a further form of anti-skid system in accordance with the present invention.

A second anti-skid system in accordance with the invention is shown in FIG. 4 of the accompanying drawings. This second system comprises a pulse doubler 13 of the form shown in FIG. 2, an AND gate 4, a timing and clock pulse generator 15, a binary counter 16, a first store 17, a subtractor 18, a second store 19, a comparator 20, a valve driver 21, a separate pulse generator 22, a second AND gate 23 and a NAND gate 24.

The system is arranged so that pulses from a generator 106 associated with a braked wheel of the aircraft are again passed via a pulse doubler 13 and AND gate 14 to counter 16. The system is again controlled by a timing and clock pulse generator 15 which initiates a count by the passage of a clock pulse tc to AND gate 14 in the manner described with reference to the previous system. Counter 16 thus measures the mean angular velocity of the associated wheel over the timing period. This count is then transferred to first store 17 by a timing pulse $t3$ and the next count initiated. After the second count the outputs of counter 16 and store 17 are passed to subtractor 18 where the count in counter 16 is substracted from the count in store 17 thereby obtaining a measure of the rate of change of angular velocity of the aircraft wheel. The output of the subtractor is then transferred to second store 19 by timing pulse $t1$. The count in second store 19 is compared in comparator 20 with a binary coded signal proportional to the maximum permissible deceleration and if an error signal is obtained from comparator 20, indicating a tendency to skid, the first store 17 is not reset by timing pulse $t2$, as a result of NAND gate 24, so that the wheel has to spin up to almost its original speed before the brakes are reapplied. At the same time the output of comparator 20 is arranged to enable second pulse generator 22, via AND gate 23, to count down on the count in store 17 at a rate proportional to the maximum permissible deceleration of the aircraft, thus the store signal from which the next count is subtracted is reduced by generator 22. This facility for counting down on store 17 is provided to take account of long skids during which the aircraft could slow down, due to drag, below the point where the fresh counts from counter 16 would be large enough to reset the system and allow re-application of the brakes.

The output of comparator 20 is fed to valve driver 21 which converts the binary error signal from the comparator into movements of the aircraft brake control valves 102.

Figure 5:
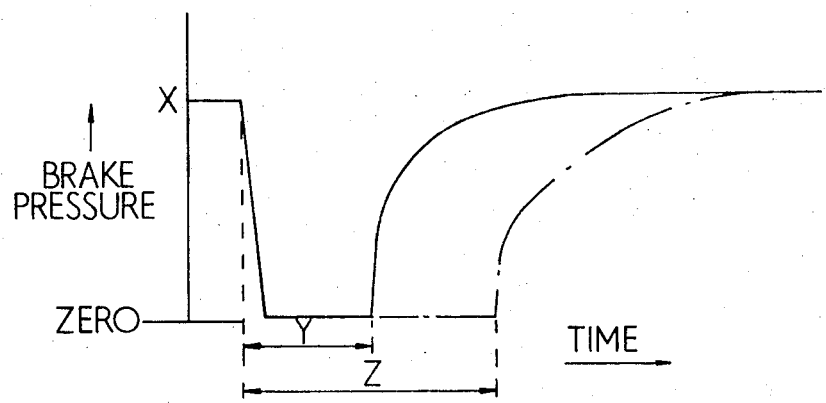
FIG. 5 is a graphical representation of the variation of brake application pressure with time, showing the manner in which braking pressure is reduced during and re-applied after two skids one of duration Y and the other of duration Z.

The system may be provided with an additional brake pressure reducing stage (not shown) which feeds the error signal to the valve driver in such a manner that the brakes are initially re-applied after a skid at a pressure level dependent on the time for which the skid has persisted and the braking pressure is then gradually increased to the level selected by the pilot. This reduces the risk of the re-application of the brakes immediately resulting in a further skid, as the longer the initial skid has persisted the lower will be the pressure level at which the brakes are initially re-applied. The manner in which this brake reapplication pressure is reduced is shown in FIG. 5 which slows the re-application of a selected brake pressure X after two skids one of duration Y and the other of duration Z.

The system functions as follows:

The first count is initiated by clock pulse $tc$ and counter 16 then proceeds to count the pulses from the generator associated with the braked wheel. At the end of the first count the count in counter 16 is subtracted, in subtractor 18, from the residual count remaining in store 17 from the previous use of the system and the output of subtractor 18 is transferred to store 19 by timing pulse $t1$. As the residual count in store 17 will be less than the first count from counter 16 the count transferred to store 19 will be negative and will not induce an output from comparator 20. Thus store 17 is reset by timing pulse $t2$ via NAND gate 24 and the first count in counter 16 is transferred to store 17 by timing pulse $t3$.

A second count is then initiated by clock pulse $tc$ and the process repeated and the output of subtractor 18 is again compared with the coded signal in comparator 20. If the second count is smaller than the first, indicating a tendency to skid, the output of comparator 20 drives valve driver 21, inhibits the resetting of store 17 via NAND gate 24 and connects generator 22 to store 17 to enable the counting down of the count in store 17 during the succeeding count as previously described.

The processes described above are repeated under the control of timing and clock pulse generator 15 thereby continually comparing the output of subtractor 18 with the coded signal in comparator 20. Thus the system continuously monitors the rate of change of angular velocity of the associated braked wheel and adjusts the braking pressure accordingly via valve driver 21. The system may include the brake pressure reducing stage previously mentioned, in which case re-appliccation of the brakes takes place in the manner described above.

Figure 6:
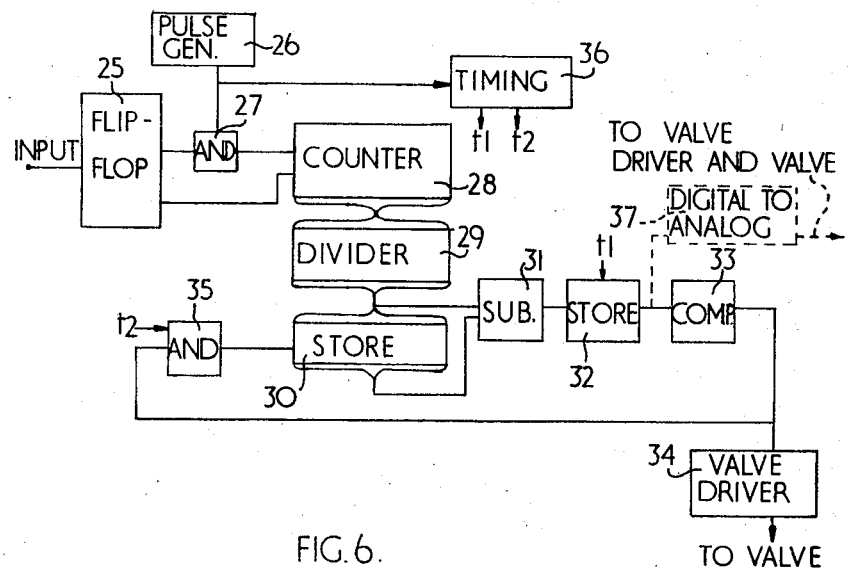
FIG. 6 is a schematic diagram of a still further form of anti-skid system in accordance with the present invention.

A third anti-skid system in accordance with the present invention is shown in FIG. 6 of the accompanying drawings. This system differs from the system shown in FIG. 4 in the manner in which the velocity signal is obtained.

In this system the pulses from a generator 106 associated with a braked wheel of the aircraft enter a flip-flop 25, successive pulses from the wheel generator being arranged to change the flip-flop from one state to the other. The flip-flop is arranged in one state to connect a second pulse generator 26, via AND gate 27, to counter 28 and in the other state to disconnect generator 26 and counter 28 and to clear counter 28.

Thus the count obtained in counter 28 is inversely proportional to the mean angular velocity of the braked wheel. The inverse of the count in counter 28 is obtained in divider 29, a detailed circuit of which is shown in FIG. 7. The output of divider 29 is a signal which is directly proportional to the angular velocity of the braked wheel and this output is put through a first store 30, subtractor 31, a second store 32, comparator 33, valve driver 34 and NAND gate 35 arrangement similar to that previously described with reference to FIG. 4 which will not therefore be described in further detail. The transfer of the output of subtractor 31 to store 32 and the resetting of store 30 are carried out by timing pulses t1 and t2, respectively, delivered by a timing generator 36.

The advantage of the system shown in FIG. 6 is that the sampling time of the system can be greatly reduced thus speeding up the response of the system to even the smallest changes in angular velocity and avoiding the necessity for the provision of a down counting arrangement on store 30.

As an alternative, or as an additional control in the system shown in FIG. 6, the output of store 32 may be fed to a digital to analog converter 37, the output of which is arranged to control the valve driver in a proportional manner.

Divider 29 is arranged, as previously described, to generate the reciprocal of the count in counter 28. The manner in which the divider circuit, shown in FIG. 7, accomplishes the division process will now be described with reference to the following example in which the reciprocal of a count of 5 in counter 28 is generated in register 40. It will be understood that the normal count present in counter 28 at the end of a time interval is considerably greater than this figure which has been chosen to simplify the mathematics of the example.

When flip-flop 25 changes state so as to stop counting, the binary digit 1 is fed into the least significant position of shift register 38 and the complement of the count in counter 28 is added to the count in shift register 38 in an 8 digit binary adder 39 together with an additional binary digit 1 which is added to the result of the above addition in the least significant position in the normal end around carry manner. The carry output from the eighth and most significant digit position is read into register 40, in the most significant digit position.

Taking the example chosen of a count of 5 in counter 28, which is 00000101 in eight digit binary notation, the complement of the count in counter 28 is 11111010. This figure is added to the count in register 38, which is 00000001, in the end-around-carry manner described above to give an answer of 11111100. The carry-output of the eighth and most significant digit position of the above answer is zero, thus a zero binary digit is fed into register 40 in the most significant digit position. The divider circuit is arranged, so that a zero carry output, as described above, prevents store 41 from reading the result of the addition in adder 39, while a carry-output of one allows store 41 to read the result of the addition and also enables AND gate 42, in conjunction with timing pulse T3, to read the contents of store 41 into shift register 38 in place of the original one digit input.

After the first addition described above the count in shift register 38 is moved up one significant position by a timing pulse T4 and thus becomes 00000010. Prior to a second addition in which the shifted count in register 39 is added to the complement of the count in counter 28, the count in register 40 is moved down one position by timing pulse T1. The above addition operation and associated transfer and timing pulse operations are then repeated twice until the count in register 38 reaches 00001000 by virtue of the shifting of timing pulse T4, each of the additions performed in reaching this position resulting in a zero digit carry output. Thus at the commencement of the addition when the count in register 38 is 00001000 the count in register 40 is 000.

When the count of 00001000 in register 38 is added to the complement of the count in counter 28 in the end around carry manner previously referred to above the resulting answer is 100000011 which has an eighth digit carry output of one. This carry-output is fed into register 40 as previously described, making the count in register 40 read 1000, and results in the eight least significant digits of the result of the addition, that is 00000011, being read into register 38 in place of the shifted original one digit input of 00001000 as previously described. In the subsequent addition operation the count in register 38, which is 000001100 after shifting by timing pulse T4, is added to the complement of the count in counter 28.

In the circuit shown in FIG. 7, subsequent addition operations are carried out in the manner described above under the control of ring counter 43 in conjunction with AND gates 44 and 45 and timing pulse generator 46 until 12 cycles (that is addition operations) have been made when the division process is completed. The number of cycle performed for each division process, which is controlled by ring counter 43, determines the accuracy of the reciprocal which is generated in register 40.

Each time an addition operation produces a one digit eighth position carry output the eight least significant digits of the result of the addition are read into the shift register 38 as described above.

Taking the example chosen it can be shown that after 12 cycles the count in register 40, which is the required reciprocal, is 100110011000. This count, by virtue of the fact that the carry outputs from adder 39 are fed into register 40 in the conventional most significant position and progressively shifted towards the conventional least significant position, must be interpreted as having it most significant position at the right-hand end and can be expressed as $0 \times 2^0 + 0 \times 2^{-1} + 0 \times 2^{-2} + 1 \times 2^{-3} + 1 \times 2^{-4} + 0 \times 2^{-5} + 0 \times 2^{-6} + 1 \times 2^{-7} + 1 \times 2^{-8} + \ldots$ etc. Thus the required reciprocal expressed as a vulgar fraction is 1/8 + 1/16 + 1/125 + 1/256 + . . . , that is 51/256 or approximately 1/5. The division process described above is repeated after the flip-flop has changed state twice.

In the first two systems described above the time interval between successive clock pulses tc is typically of the order of 0.1 seconds. The wheel velocity generator used in any of the above systems, which may be of any suitable form such as, for example the electromagnetic type or the optical type arranged to generate of the order of 700 pulses during each count. Thus, as can be appreciated, the systems are quick to respond to small fluctuations in the rate of change of angular velocity of the associated wheel.

Having now described our invention, what we claim is:

1. A vehicle anti-skid system comprising a first pulse generator arranged to produce an electrical signal at a frequency directly proportional to the angular velocity of a braked wheel of the vehicle and a flip-flop arranged to change state each time a pulse is received from the first generator, one state of the flip-flop being arranged to initiate a count in a digital counter and the other state of the flip-flop being arranged to terminate the count, a further higher frequency pulse generator being connected between the flip-flop and counter so that the counter records the number of pulses received from the higher frequency pulse generator between successive pulses from the lower frequency pulse generator thus providing a count which is inversely proportional to the angular velocity of the braked wheel, and means responsive to the output of said counter for controlling the braking of said wheel.

2. A system according to claim 1 in which a digital counter is arranged to count the number of pulses from the first generator in successive time intervals, the number of pulses counted during each time interval being subtracted from the number of pulses counted during the previous time interval in order to obtain a measure of the actual rate of change of velocity of the braked wheel.

3. A system according to claim 2 in which the count recorded in the digital counter during each time interval is transferred to a down counter at the end of the time interval, and during the next time interval, in which a new count is generated in the digital counter, the count in the down counter is counted down so that at the end of the next time interval the count remaining in the down counter is the difference between the counts recorded by the digital counter in successive time intervals and is therefore proportional to the rate of change of angular velocity of the braked wheel.

4. A system according to claim 2 in which the count recorded in the digital counter during each time interval is transferred to a first store at the end of the time interval, the count recorded in the counter during the next time interval being subtracted from the previous count now in the first store to give a count proportional to the rate of change of angular velocity of the braked wheel, this count being then transferred to a second store and hence to a comparator in which the count is compared with a count proportional to the maximum permissible rate of change of angular velocity of the braked wheel.

5. A system according to claim 4 in which at the end of a time interval during which the system detects that the rate of charge of angular velocity of the braked wheel is in excess of the maximum permissible level the count present in the first store is retained and the first store is connected to a further pulse generator which counts down the count in the first store at a rate proportional to the maximum permissible deceleration of the vehicle.

6. The system according to claim 1 wherein a divider is provided to generate the reciprocal of the count in the counter thereby providing a count directly proportional to the rate of change of the angular velocity of the braked wheel.

7. A system according to claim 1 wherein a pulse doubler is provided to double the frequency of the pulses from the first generator.

8. A vehicle anti-skid system comprising:
   a. first pulse generator means for generating an electrical signal having a frequency directly proportional to the angular velocity of a braked wheel of said vehicle,
   b. a flip-flop coupled to said first pulse generator, said flip-flop changing states each time a pulse is received from said first pulse generator,
   c. second pulse generator means having a frequency higher than the frequency of said first pulse generator,
   d. counter means selectively coupled to said second pulse generator means by the output of said flip-flop, the output of said second pulse generator means being coupled to said counter to initiate a count when said flip-flop is in one state and the output of said second pulse generator being disconnected from said counter to terminate said count when said flip-flop is in its other state, said counter recording the number of pulses received from said second pulse generator between successive pulses from said first pulse generator thereby providing a count which is inversely proportional to the angular velocity of said braked wheel,
   e. divider means coupled to said counter for generating the reciprocal of the count in said counter thereby producing an output directly proportional to the angular velocity of said braked wheel,
   f. a first store coupled to said divider, the output of said divider being transferred to said first store at the end of each time interval corresponding to the interval between successive pulses from said first pulse generator,
   g. a second store coupled to the outputs of said divider and said first store, said second store storing a count proportional to the difference between the outputs of said divider and first store to produce an output proportional to the rate of change of the angular velocity of said braked wheel, and
   h. comparator means coupled to said second store, said comparator comparing the output of said second store with a count proportional to the maximum permissible rate of change of angular velocity of the braked wheel, the output of said comparator means controlling the braking of said wheel.

* * * * *